United States Patent [19]
Iima

[11] Patent Number: 5,453,870
[45] Date of Patent: Sep. 26, 1995

[54] OPTICAL SCANNING SYSTEM

[75] Inventor: Mitsunori Iima, Tokyo, Japan

[73] Assignee: Asahi Kogaku Kogyo Kabushiki Kaisha, Tokyo, Japan

[21] Appl. No.: 191,475

[22] Filed: Feb. 4, 1994

[30] Foreign Application Priority Data

Feb. 4, 1993 [JP] Japan ................................. 5-017620

[51] Int. Cl.$^6$ ................................................ G02B 26/08
[52] U.S. Cl. ........................... 359/205; 359/217; 359/219; 359/662
[58] Field of Search ..................................... 359/196, 205, 359/217, 206, 218, 662, 219, 207

[56] References Cited

U.S. PATENT DOCUMENTS

| | | | |
|---|---|---|---|
| 4,443,055 | 4/1984 | Matsudka et al. | 359/218 |
| 4,756,584 | 6/1988 | Takanashi | 359/218 |
| 4,818,046 | 4/1989 | Kondo | 359/206 |
| 4,930,850 | 6/1990 | Morimoto | 359/207 |
| 5,200,850 | 4/1993 | Iizuka et al. | 359/207 |
| 5,251,069 | 10/1993 | Iizuka | 359/717 |

FOREIGN PATENT DOCUMENTS

| | | |
|---|---|---|
| 61-120112 | 6/1986 | Japan . |
| 2-39120 | 2/1990 | Japan . |
| 2-46418 | 2/1990 | Japan . |

Primary Examiner—Paul M. Dzierzynski
Assistant Examiner—Suma N. Ramaswamy
Attorney, Agent, or Firm—Sandler, Greenblum & Bernstein

[57] ABSTRACT

An optical scanning system is provided which includes a light source, a scanning deflector which deflects a bundle of rays emitted from the light source, and a scanning lens system which converges the deflected bundle of rays onto an image surface to form an image. The scanning lens system has at least two lenses, wherein the lens closest to the image surface is a meniscus lens with a surface which is convex in the main scanning direction facing the image surface. A surface of the meniscus lens nearest to the scanning deflector is a deformed toric surface which is convex in a sub scanning direction facing the scanning deflector. The sub scanning direction is normal to the main scanning direction. The convexed toric surface has a radius of curvature which is determined independently of a radius of curvature in the main scanning direction.

13 Claims, 14 Drawing Sheets

Fig_3

OPTICAL SCANNING SYSTEM

BACKGROUND OF THE INVENTION

1. Field of the Invention

The present invention relates to an optical scanning system used for a laser printer or a similar optical device. More precisely, the invention relates to an optical scanner having a scanning lens with a correcting lens which compensates for aberration.

2. Description of Related Art

In the case that color printing is to be done, or if it is necessary to increase the resolution of an object to be printed, the diameter of the optical scanner beam must be as small as possible to thereby enhance the resolving power. For a small and compact printer to print on a large printing medium, it is necessary to increase the scanning width (i.e., range) as much as possible.

As a solution to the above problems, it is known to provide an aberration correcting lens in a beam scanner, in addition to a conventional fθ lens which functions to form an image. Furthermore, in a known optical scanner having a polygonal mirror as a deflector, the bundle of beams is usually converged in the sub scanning direction in the vicinity of the polygonal mirror to prevent the scanning line from being deviated in the sub scanning direction due to inclination of the polygonal mirror surface (from an upright position). Consequently, the power is increased in the sub scanning direction and, accordingly, the curvature of the field, etc., becomes extreme, particularly in the sub scanning direction.

The optical system having the aberration correcting lens in addition to the fθ lens is disclosed, for example, in Japanese Unexamined Patent Publication No. SHO61-120112. In this optical system, there is a deformed cylindrical lens (i.e., toric lens) having curvature within the sub scanning surface which decreases from the optical axis towards the periphery between the two fθ lenses which mainly function to form an image and an image surface. With this arrangement, since the position of the image to be formed within the sub scanning section of the image surface is moved towards the polygonal mirror in the central portion of the image surface, and away from the polygonal mirror in the peripheral portion of the image surface, the curvature of the field within the sub scanning section can be reduced.

The toric lens, disclosed in JPP '112 mentioned above, has a curved surface defined by a locus that is obtained by revolving an arc having a radius of curvature Ry in the main scanning direction about an axis y as shown in FIG. 13. The radius of curvature Rz in the sub scanning direction is determined in accordance with the radius of curvature Ry in the main scanning direction. Accordingly, if the image forming position within the sub scanning section irregularly changes, depending on the efficiency of the image forming lens, etc., or due to the change in the position of the deflection point of the polygonal mirror, it is impossible to completely correct the curvature of the field.

The correction can be carried out by using a deformed toric surface in which the radius of curvature in the sub scanning direction is determined independently of the radius of curvature in the main scanning direction, as disclosed, for example, in Japanese Unexamined Patent Publication No. HEI2-39120 or HEI2-46418.

In the scanning optical system disclosed in JPP '120 mentioned above, the deformed toric surface is located between the polygonal mirror and the fθ lens at a position in which the magnification is high, i.e., at a position away from the image surface. In general, the deformed toric lens is made of molded plastic since its shape is complex. However, the refractive index of a plastic lens largely varies depending on the change in the temperature. Moreover, plastic lenses have a high rate of linear expansion. Consequently, the location of the plastic toric lens away from the image surface causes the focal point to change considerably due to the temperature variation.

In the scanning optical system, disclosed in JPP '418 mentioned above, the deformed toric surface is formed on the surface of the fθ lens. In this arrangement, if the fθ lens, provided with the deformed toric surface, is made of plastic, since the power thereof is large, there would be a considerable displacement of the focal point due to the temperature change. If the fθ lens, provided with the deformed toric surface, is made of glass, a precise grinding machining process is necessary. Accordingly, the fθ lenses can be neither mass-produced nor inexpensively manufactured.

SUMMARY OF THE INVENTION

The primary object of the present invention is to provide an optical scanning system having an fθ lens system which is provided with a deformed toric surface whose radius of curvature in the sub scanning direction is determined independently of the radius of curvature in the main scanning direction, wherein, if the fθ lens provided with the deformed toric surface is made of plastic, an influence thereon by a change in temperature is minimized.

To achieve the object mentioned above, according to the present invention, an optical scanning system is provided which includes a light source, a scanning deflector which deflects a bundle of rays emitted from the light source, and a scanning lens system which converges the deflected bundle of rays onto an image surface to form an image. The scanning lens system has at least two lenses, wherein the lens closest to the image surface is a meniscus lens with a surface which is convex in the main scanning direction facing the image surface. A surface of the meniscus lens nearest to the scanning deflector is a deformed toric surface which is convex in a sub scanning direction facing the scanning deflector. The sub scanning direction is normal to the main scanning direction. The convexed toric surface has a radius of curvature which is determined independently of a radius of curvature in the main scanning direction.

It is preferable that the scanning lens system includes an imaging lens group which mainly functions to form an image, and a correcting lens group which mainly functions to correct an aberration on the image surface. In this arrangement, the imaging lens group is located nearer to the scanning deflector than the correcting lens group, with the deformed toric surface being provided on the correcting lens group.

In one possible arrangement, the image lens group can have two imaging lenses which have a positive power in the main scanning direction, and the correcting lens group may be comprised of a single lens.

It is preferable that the two imaging lenses of the imaging lens group satisfy the following relationship;

$$.6 \leq f/f_1 \leq .7$$

wherein "f1" designates a focal length of the lens of the imaging lens group that is located nearest to the scanning deflector in the main scanning direction, and "f" designates a focal length of the scanning lens system as a whole in the main scanning direction.

According to another aspect of the present invention, an optical scanning system is provided which includes a light source, a scanning deflector which deflects a bundle of rays emitted from the light source, and a scanning lens system which converges the deflected bundle of rays onto an image surface to form an image. The scanning lens system is comprised of at least two lenses which satisfy the following relationship;

$$.6 \leq f1 \leq .7$$

wherein "f1" designates a focal length of the lens of the scanning lens that is located nearest to the scanning deflector in the main scanning direction, and wherein "f" designates the focal length of the scanning lens system as a whole in the main scanning direction. It is preferable that the imaging lens closest to the image surface is made of a meniscus lens with a convex surface that faces the image surface in the main scanning direction, wherein a surface of the meniscus lens nearest to the scanning deflector is a deformed toric surface which is convex in a sub scanning direction facing the scanning deflector. The convexed toric surface has a radius of curvature which is determined independently of a radius of curvature in the main scanning direction.

The present disclosure relates to subject matter contained in Japanese Patent Application No. HEI5-17620 (filed on Feb. 4, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

An embodiment of the scanning optical system which can be applied, for example, to a laser printer will be discussed below.

Figure 1:
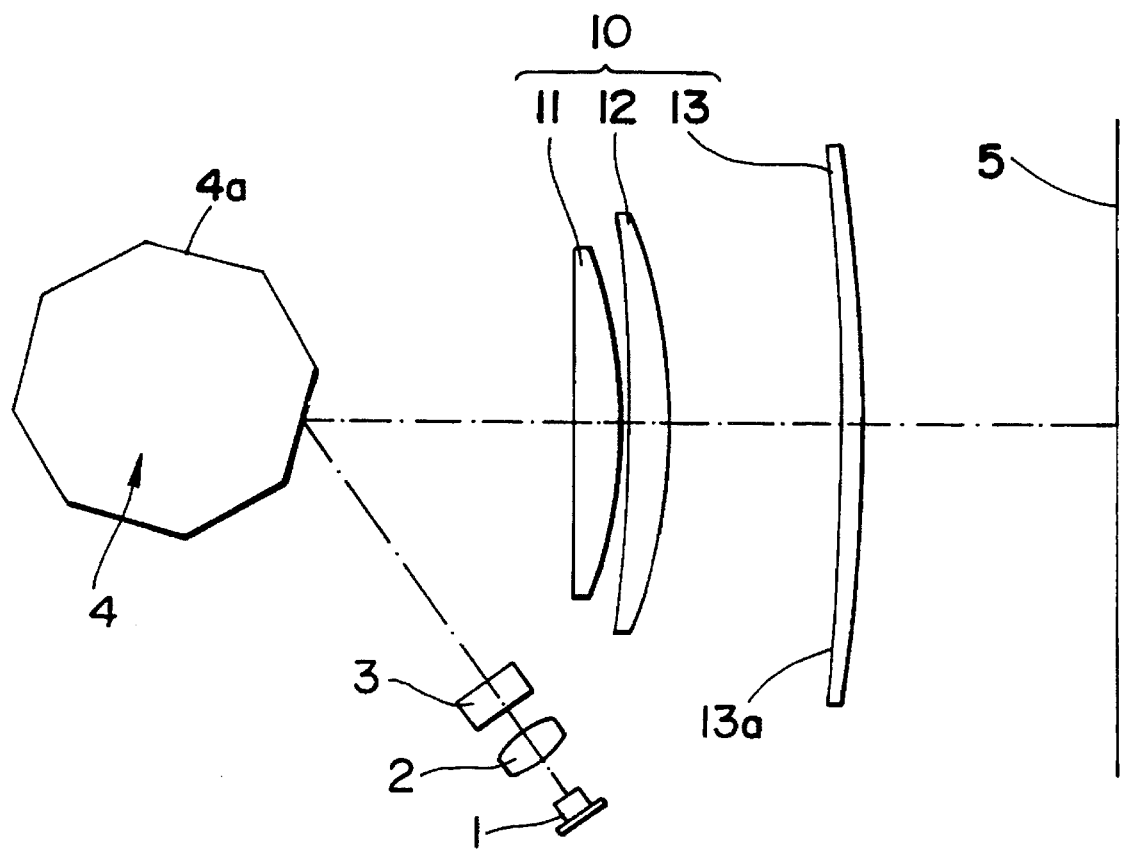
FIG. 1 is a conceptual view of a main scanning plane of an optical scanning system, according to the present invention.

With reference to FIG. 1, divergent light emitted from a light source, such as a semiconductor laser 1 is collimated by a collimating lens 2 and is converged in the sub scanning direction (i.e., direction perpendicular to the drawing) by a cylindrical lens (i.e., anamorphic image forming lens) 3 to form a line image.

A polygonal mirror 4 as a scanning deflector has a reflecting surface 4a that is located in the vicinity of the line image to reflect and deflect the bundle of rays. The deflected bundle of rays is converged onto an image surface 5 by an fθ lens system 10 as a scanning lens system to form a spot image. The spot image is scanned on the image surface 5 in accordance with the rotation of the polygonal mirror 4.

The fθ lens system 10 includes of two imaging lenses 11 and 12 that mainly function to form an image, and a correcting lens 13 that mainly functions to correct an aberration on the image surface. The optical elements 11, 12 and 13 are arranged in this order from the polygonal mirror side. The correcting lens 13 is a meniscus lens with a convex surface facing the image surface 5. The surface 13a of the correcting lens 13, adjacent to the imaging lens 12, forms a deformed toric surface having a radius of curvature in the sub scanning direction that is determined independently of the radius of curvature in the main scanning direction.

The imaging lenses 11 and 12, and the correcting lens 13 are all plastic lenses. Since the correcting lens 13, which is located adjacent to the image surface 5 between the image surface 5 and the imaging lenses 11 and 12, at a position in which the magnification is small, there is little displacement or fluctuation of the focal point due to the temperature change, thus resulting in little or no change of efficiency of the optical system.

Furthermore, the location of the correcting lens 13 adjacent to the image surface 5 makes the width of light small (i.e., spot diameter in the direction perpendicular to the sheet of the drawings) incident upon the correcting lens 13. Accordingly, a complex shape of the deformed toric lens requires less surface precision.

Moreover, in the case that S-polarized light is incident upon the correcting lens 13, it is possible to make the S-polarized light incident upon the correcting lens at angles approximate to right angles, since the correcting lens 13, which is a meniscus lens, with a convex surface facing the image surface 5. Consequently, there is little optical energy lost by the reflection of the incident light by the correcting lens 13. In view of a difficulty in coating a plastic lens with an anti-reflection film, it is particularly advantageous to use a meniscus shape of plastic lens.

Figure 2:
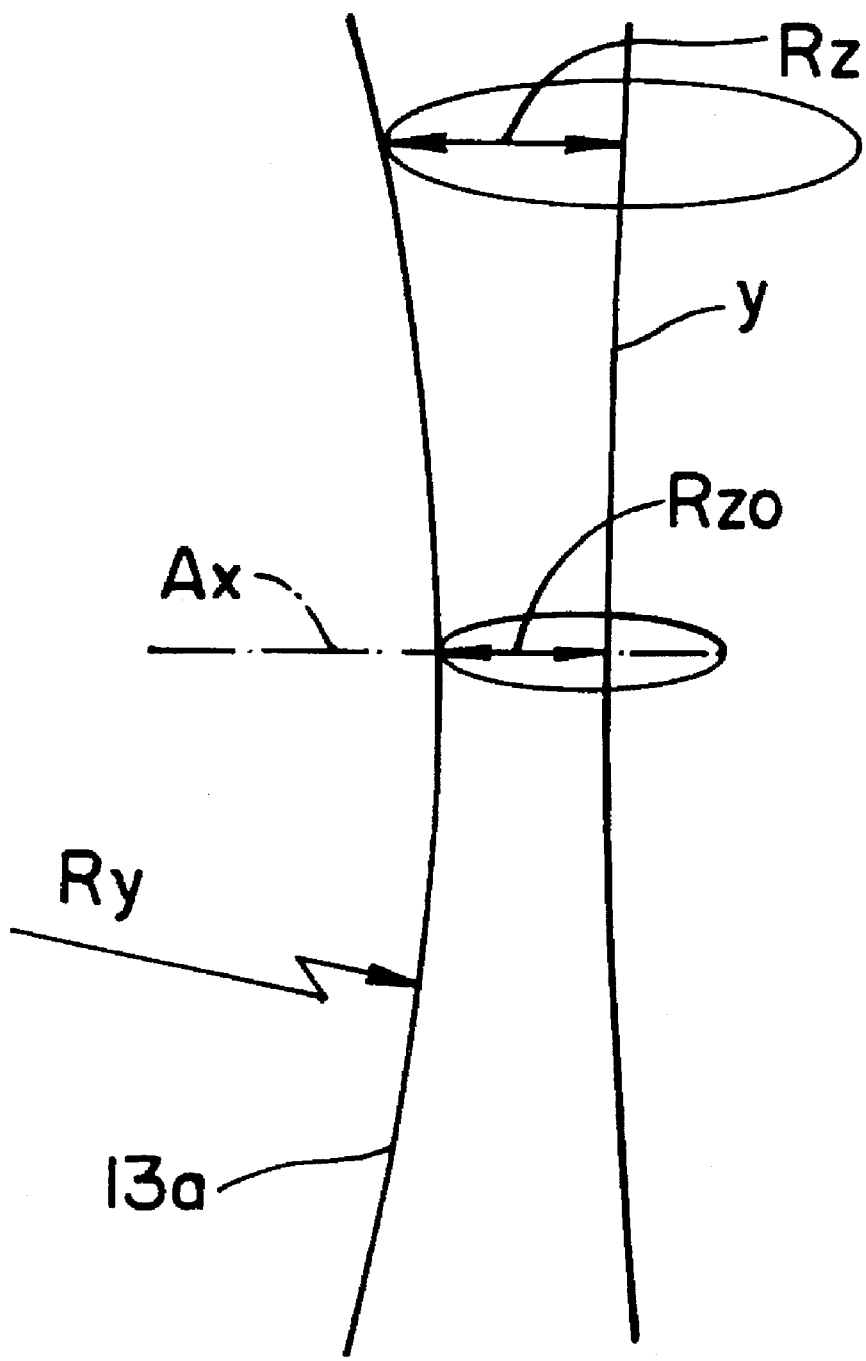
FIG. 2 is a conceptual view of a deformed toric surface used in an fθ lens system of a scanning optical system, according to the present invention.
Figure 13:
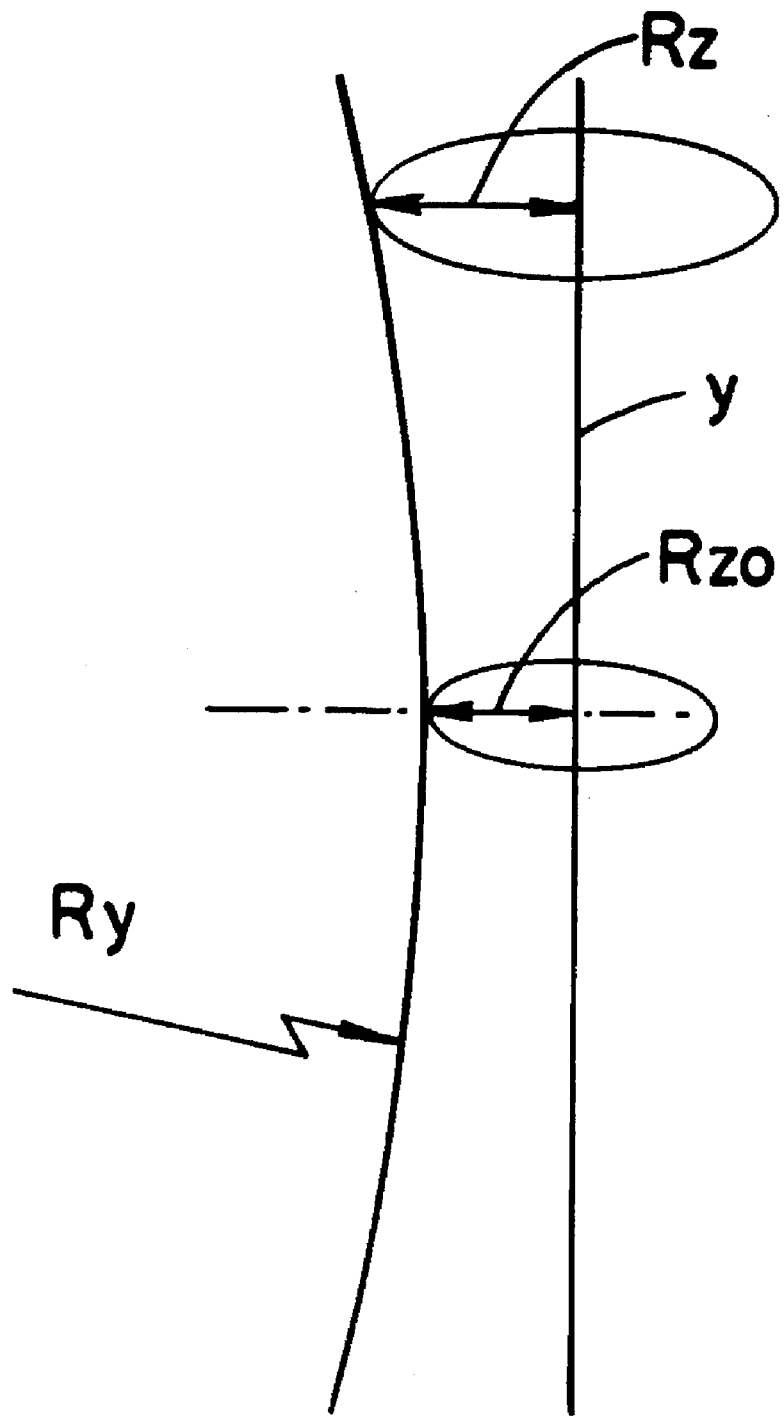
FIG. 13 is a conceptual view of a deformed toric surface used in an fθ lens system of a known scanning optical system.

FIG. 2 shows the shape of the deformed toric surface 13a by way of example. The entire shape thereof in the sub scanning direction (i.e., sectional shape in the direction perpendicular to the sheet of the drawings) is convex. The radius of curvature Rz, in the sub scanning direction, increases from the optical axis Ax towards the periphery, similar to the arrangement shown in FIG. 13, but the rate of increase is not necessarily constant. Namely, the radius of curvature Rz in the sub scanning direction can be optionally determined independently of the radius of curvature Ry in the main scanning direction. Consequently, the centers of curvature in the sub scanning direction are located on a curved line depending on the change in the image height. Thus, the curvature of the field can be independently corrected in the main and sub scanning directions.

Namely, the deformed toric lens, used in the scanning optical system according to the present invention, is made concave in the main scanning direction and convexed in the sub scanning direction, as mentioned above. The following advantages are expected from the deformed toric lens as constructed above.

Figure 14:
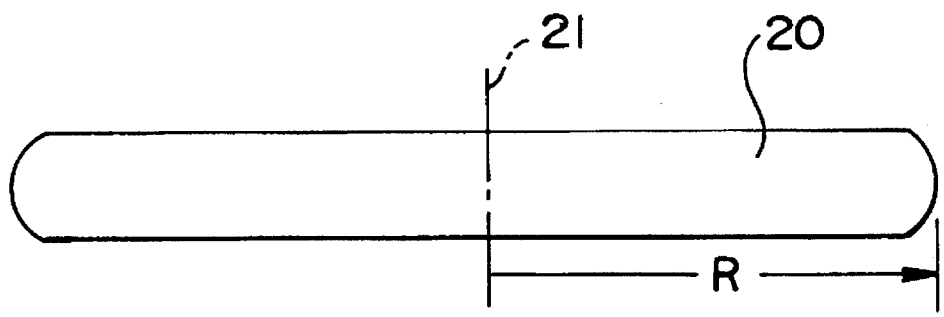
FIG. 14 is a front elevational view of a grinding wheel which is adapted to produce a molding die for a plastic lens with a deformed toric surface; and, FIG. 15 is a plan view of a grinding wheel shown in FIG. 14, showing an arrangement to produce a molding die having a surface for a convexed toric surface in a main scanning direction and an arrangement to produce a concaved toric surface, using the grinding wheel.
Figure 15:
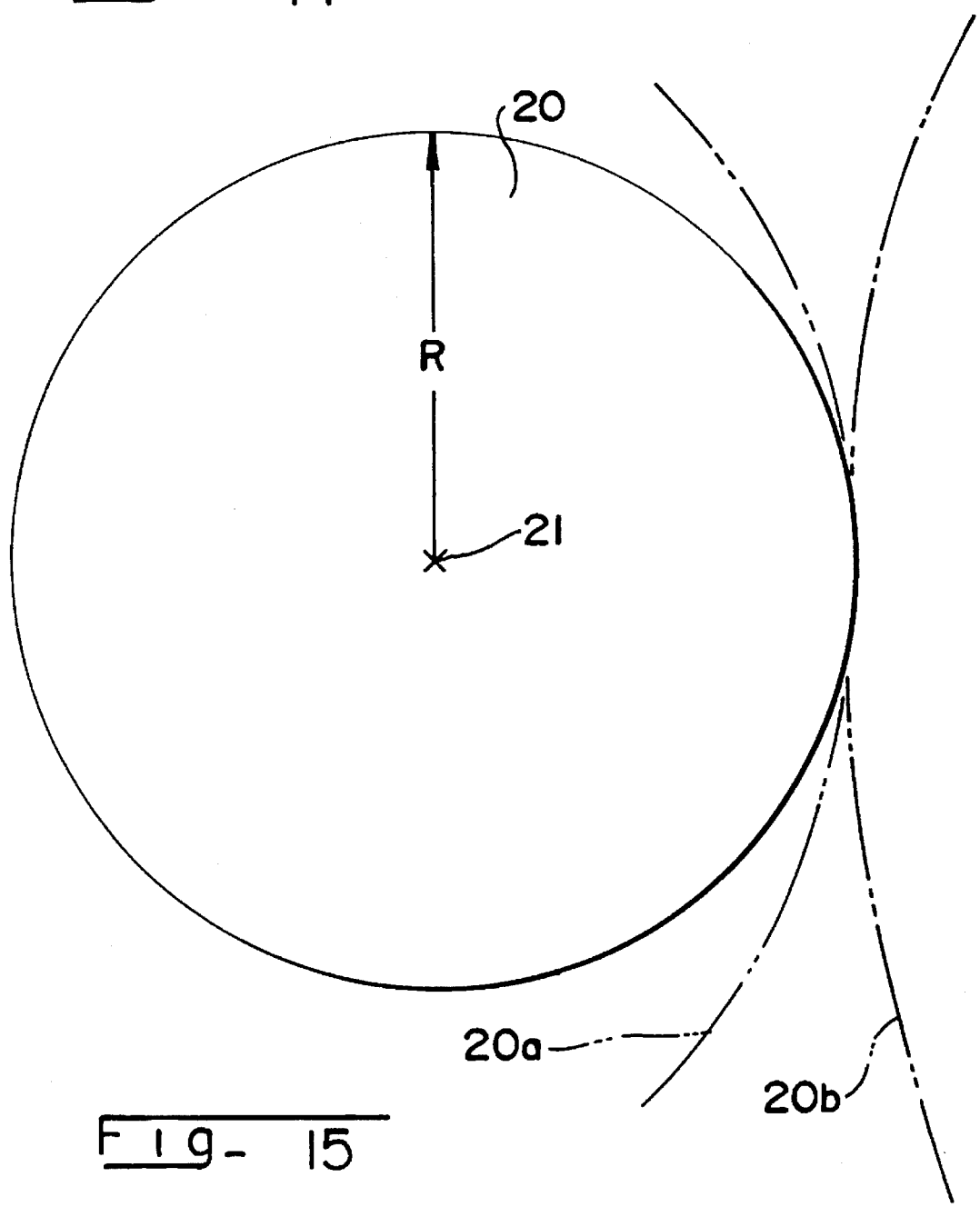

In general, the deformed toric lens is made of molded plastic. The molding die is ground by a disc-shaped grinding wheel 20 as shown in FIGS. 14 and 15. The grinding wheel 20 is rotatable about an axis 21 and has a large radius R for precision grinding. Accordingly, if the shape of the molding die within a plane in which the grinding wheel 20 rotates is a concave surface 20a (corresponding to a convex lens surface), the radius of curvature of the concave surface 20a cannot be smaller than the radius R of the grinding wheel 20. On the other hand, if the shape of the molding die within a plane in which the grinding wheel 20 rotates is a convex surface 20b (corresponding to the concave lens surface), there is no restriction to the radius of curvature of the concave surface 20a. This increases the freedom of design of the shape of the molding die.

Furthermore, in the case that the shape of the molding die in the sub scanning section (i.e., the section perpendicular to the plane of the rotation of the grinder) is a concave shape (corresponding to the convex lens surface), if the molding die also has a concave shape (corresponding to the concave lens surface) in the main scanning direction, the whole surface of the molding die is concave. This would make it difficult for an operator to visually identify the center of the grinding surface upon grinding the molding die. Consequently, the molding die might not be precisely produced.

Conversely, in case of a deformed toric lens which is made concave in the main scanning direction and convexed in the sub scanning direct ion, as in the present invention, there is freedom in the shape of the main scanning surface. Accordingly, the molding die is not entirely concave. This makes it possible to easily and precisely produce the molding dies. Note that the lens with the deformed toric surface is preferably a positive lens in the main scanning direction. To this end, the lens is preferably of a meniscus shape in the main scanning direction, as will be described below.

The following discussion will be addressed to examples of concrete structure of the fθ lens system used in the scanning optical system discussed above.

Embodiment 1

Figure 3:
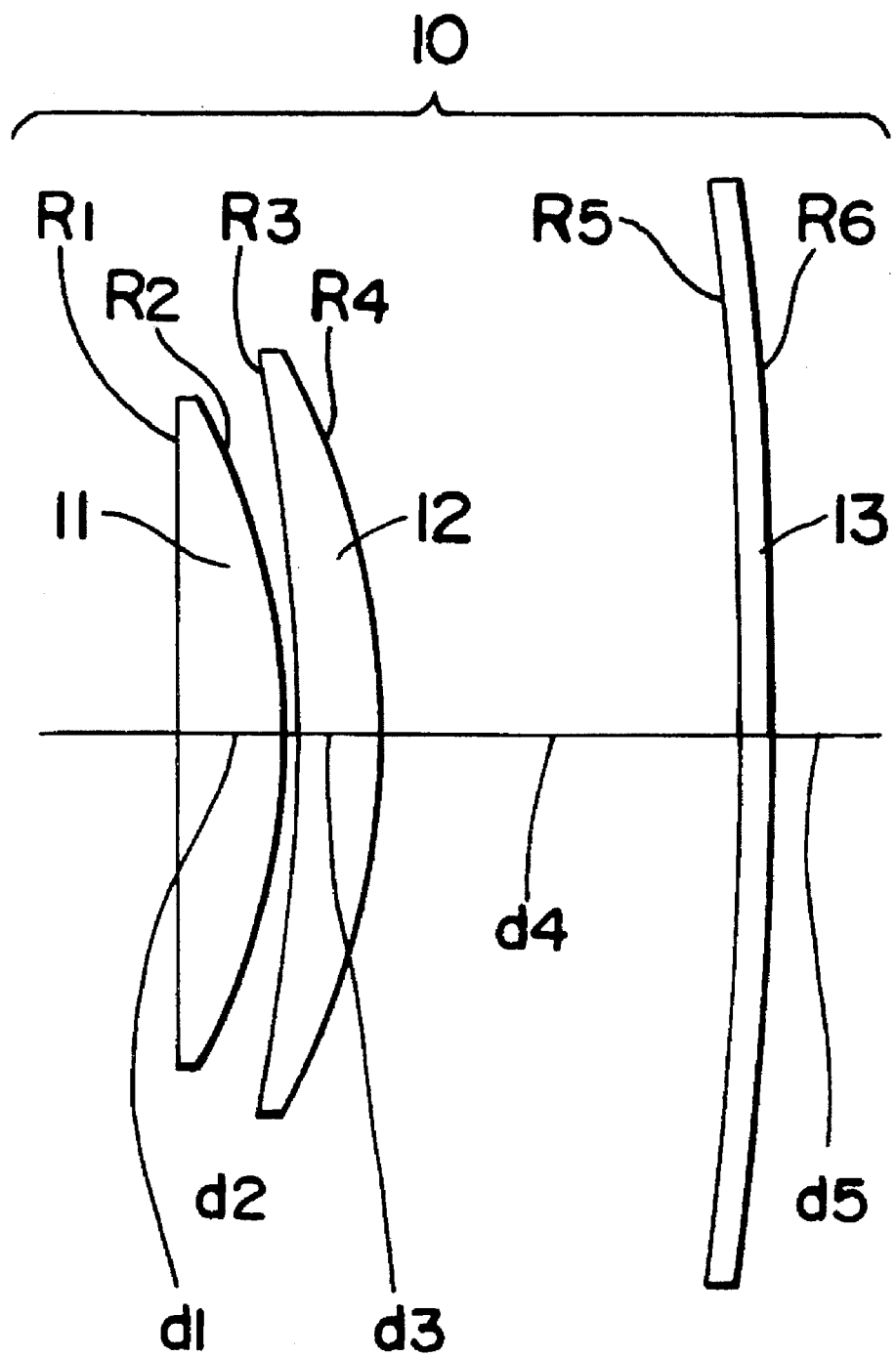
FIG. 3 is a conceptual view of an fθ lens system according to a first embodiment of the present invention.

FIG. 3 shows a first example of the lens structure. In the first embodiment and a second embodiment discussed below, the fθ lens system 10 includes two imaging lenses 11, 12 and a single correcting lens 13.

Moreover, in the first and second embodiments, the two imaging lenses 11 and 12 are both positive lenses. Generally speaking, if the scanning optical system is composed of plastic lenses, all the imaging lenses preferably have a positive power in the main scanning direction, because if there is a lens having a negative power in the main scanning direction, the power of the positive lens(es) of the imaging lens group having a positive power as a whole must be increased. However, the increase in the power of the positive lens(es) means a decrease in the radius of curvature of the lens surface thereof and an increase in the thickness of the peripheral portion thereof, thus leading to an increase of the whole thickness of the lens(es). The thick lens disadvantageously requires longer molding time and is less precise than a thin lens. This is the reason that the imaging lenses are preferably all made of positive lenses.

In addition to the foregoing, in case where all the imaging lenses are positive lenses, it is not advisable to concentrate the power on a specific lens. Namely, the lenses should share the power. Moreover, taking into account a fact that a height of light incident upon a lens closer to the deflector from the optical axis is higher than a lens away from the optical axis, the lens close to the deflector preferably has a larger power than the lens away from the optical axis.

In the first and second embodiments, the two imaging lenses 11 and 12 preferably satisfy the following relationship;

$$.6 \leq f1 \leq .7$$

wherein "f1" designates the focal length of the imaging lens that is located closer to the deflector in the main scanning direction; and "f" the focal length of the whole scanning lens system in the main scanning direction, respectively.

The numerical data of the lens structure in the first embodiment is shown in Table 1 below. In Table 1, "f" designates the focal length of the whole fθ lens system 10 in the main scanning direction; "fz" the focal length of the correcting lens 13 in the sub scanning direction; "ω" the half angle of view; "d0" the distance from the reflecting surface 4a of the polygonal mirror 4 to the first lens surface of the fθ lens (i.e., first lens surface of the imaging lens 11); "Ry" the radius of curvature in the main scanning direction; "d" the lens thickness or the spatial distance (d6 is the distance from the terminal lens surface of the fθ lens to the image surface on the optical axis); and, "n" the refractive index at 780 nm (wavelength), respectively.

TABLE 1

| f = 134.89 | f1 = 208.59 | f/f1 = 0.65 | |
|---|---|---|---|
| fz = 51.12 | fz/f = 0.38 | ω = 45.87 | d0 = 37.0 |
| lens surface No. | Ry | d | n |
| 1 | 2822.00 | 15.6 | 1.48617 |
| 2 | −105.00 | 2.0 | |
| 3 | −270.00 | 13.3 | 1.48617 |
| 4 | −107.00 | 52.0 | |
| 5 | −710.00 | 5.0 | 1.48617 |
| 6 | −632.80 | 74.64 | |

Figure 4:
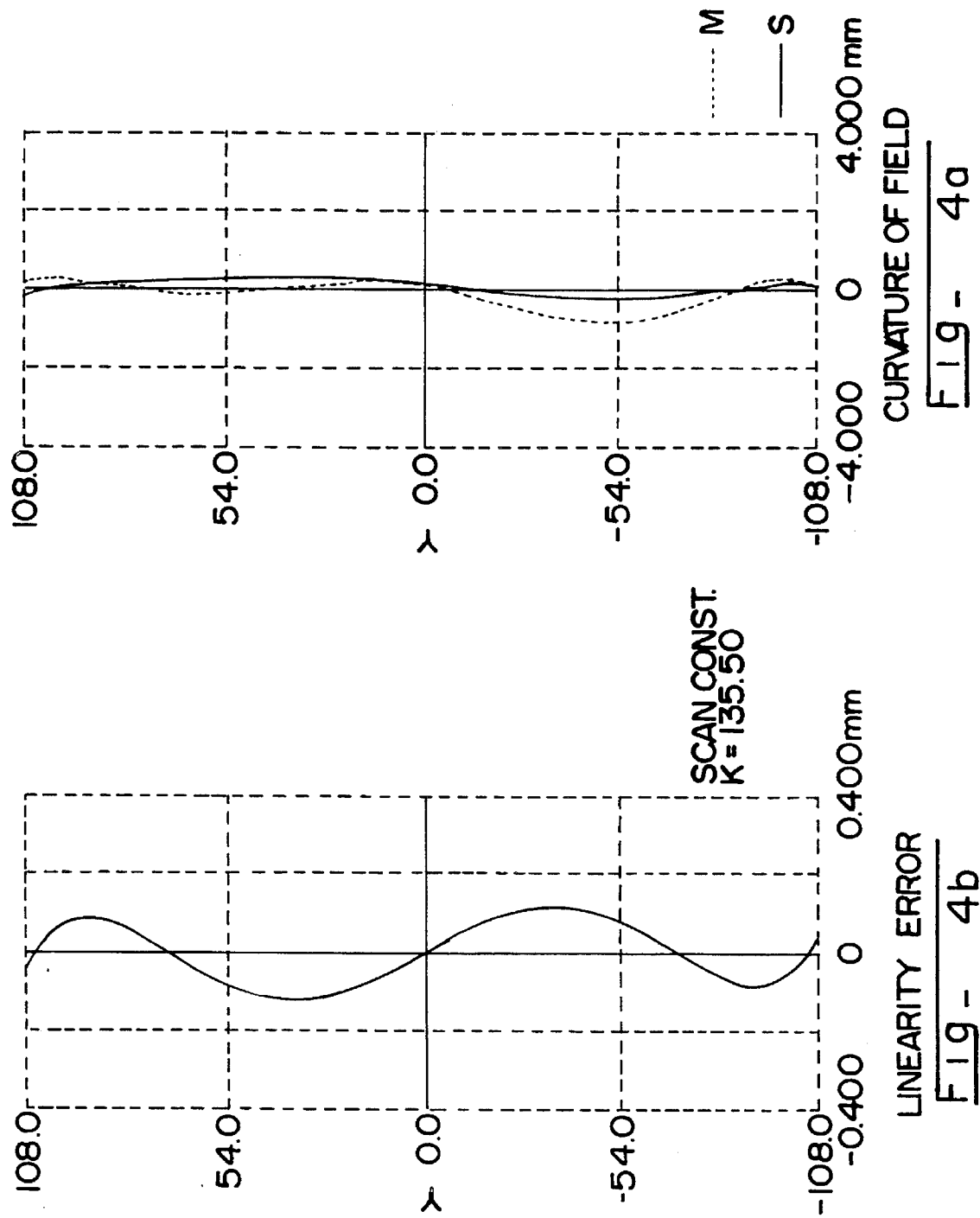
FIGS. 4a and 4b are diagrams of fθ characteristics and the curvature of the field of the fθ lens shown in FIG. 3.

FIGS. 4a and 4b show the fθ characteristics and the curvature of the field (out of focus), of the fθ lens in the first embodiment, respectively. In FIGS. 4a and 4b, "M" designates the meridional direction (i.e., main scanning direction); and "S" the sagittal direction (i.e., sub scanning direction), respectively. The ordinate represents the scanning position in the main scanning direction and the abscissa represents the deviation of the scanning position (FIG. 4a) and the focus deviation (FIG. 4b) in the sub scanning direction, respectively.

In this embodiment, the first lens surface is an aspheric surface of rotational symmetry. The aspheric surface is defined by the following equation;

$$X = \{CY^2/(1+(1-(1+K)C^2Y^2)^{1/2})\} + A4Y^4 + A6Y^6 + A8Y^8$$

wherein "X" designates the distance from the tangential plane at the aspheric apex in coordinates of the aspheric surface at which the height from the optical axis is Y; "C" the curvature (1/r) of the aspheric apex, "K" the constant of the cone, and "A4", "A6" and "A8" the 4th, 6th, and 8th order aspheric coefficients, respectively.

The values of "K", "A4", "A6" and "A8" are shown in Table 2 below, by way of example.

TABLE 2

1st lens surface; aspheric coefficient $K = 4.12$
$A4 = -1.34 \times 10^{-7}$
$A6 = 2.77 \times 10^{-11}$
$A8 = -3.16 \times 10^{-15}$ The fifth lens surface (i.e., first lens surface of the correcting lens 13) is a deformed toric surface. The radius of curvature Rzo in the sub scanning direction on the optical axis, and the radius of curvature Rz in the sub scanning direction at the height Y from the optical axis, and coefficients B1, B2, B4 are shown in Table 3 below.

TABLE 3

5th lens surface; radius of curvature in sub scanning direction $Rzo = 25.8$
$1/Rz = 1/Rzo + B1Y + B2Y^2 + B4Y^4$
$B1 = -2.178 \times 10^{-6}$
$B2 = -1.640 \times 10^{-6}$
$B4 = 7.520 \times 10^{-11}$ In the illustrated embodiment, the deformed toric surface is preferably provided on the surface of the correcting lens 13 that is located nearest to the deflector (i.e., polygonal mirror 4), rather than the surface thereof adjacent to the image surface 5, to more effectively correct the aberration, since the incident angle and emission angle of the upper and lower beams on and from the correcting lens become small in the sub scanning direction.

Embodiment 2

Figure 5:
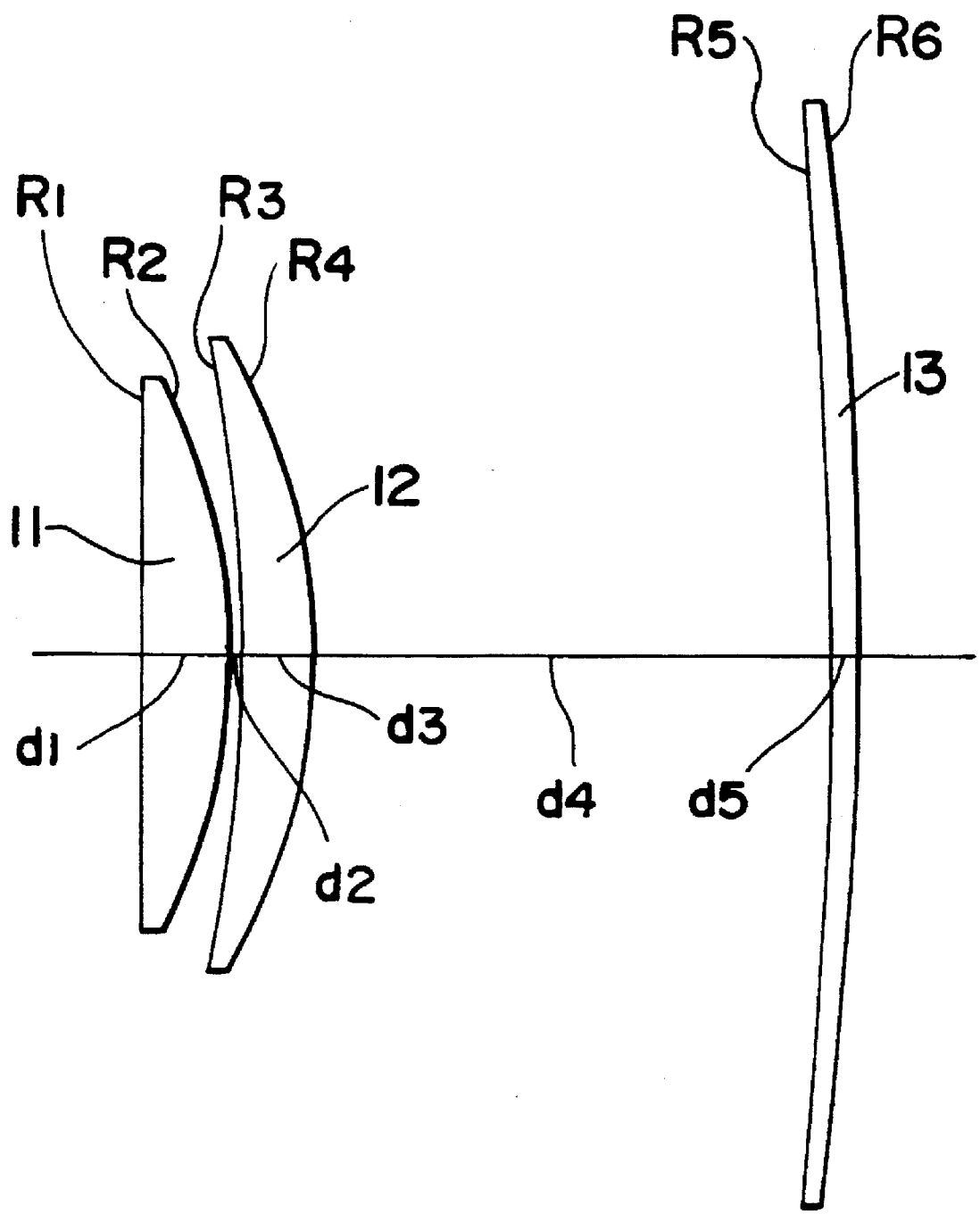
FIG. 5 is a conceptual view of an fθ lens system according to a second embodiment of the present invention.
Figure 6:
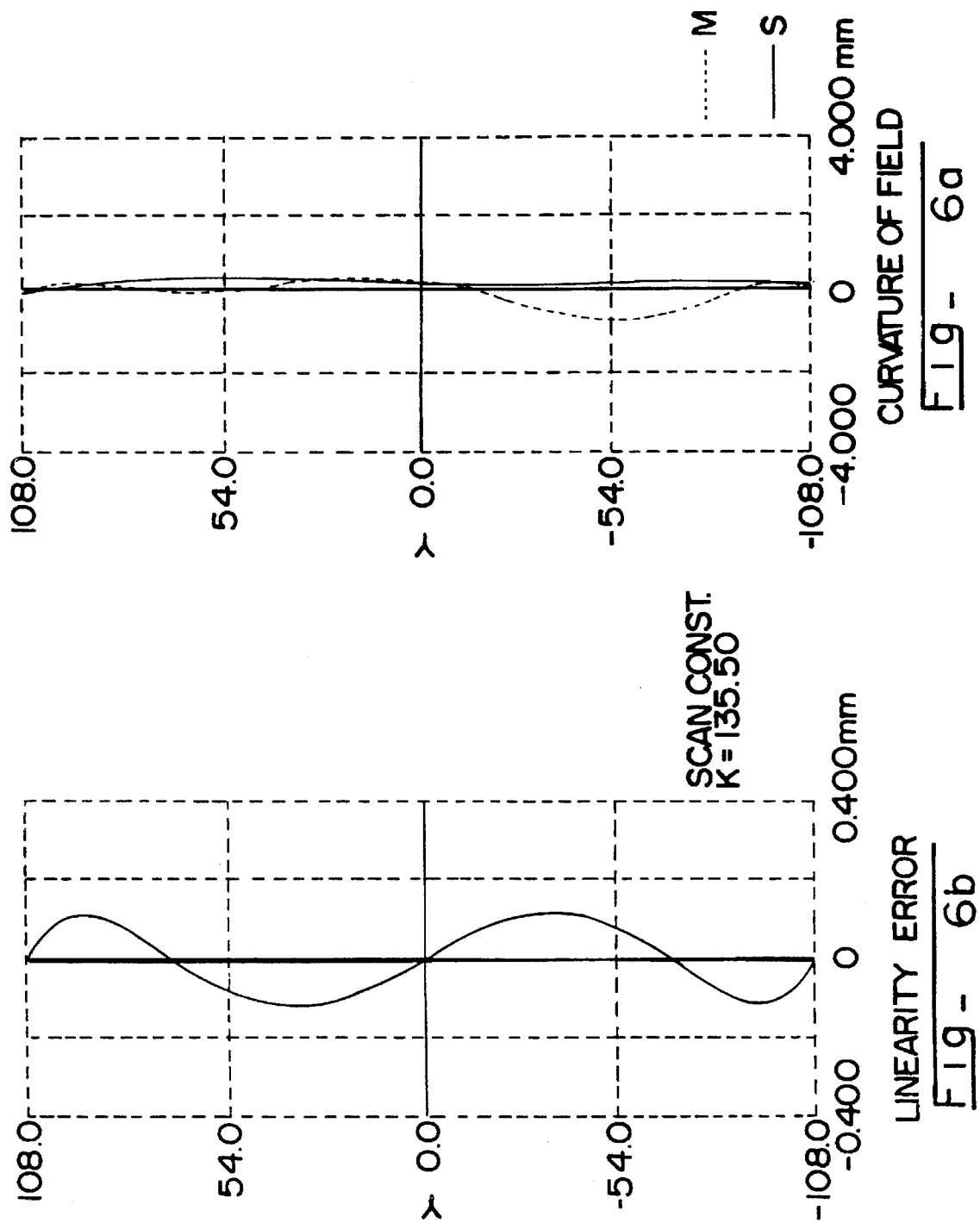
FIGS. 6a and 6b are diagrams of fθ characteristics and the curvature of the field, of the fθ lens shown in FIG. 5.

FIG. 5 shows a second example of the lens structure. Numerical data of the second embodiment is shown in Table 4 below. FIGS. 6a and 6b show the fθ characteristics (errors) and the curvature of the field (out of focus), of the fθ lens in the second embodiment, respectively. In the second embodiment, the first lens surface is an aspheric surface, and the aspheric coefficients thereof are shown in Table 5 below. The fifth lens surface is a deformed toric surface whose shape is represented by data shown in Table 6 below.

TABLE 4

| f = 134.89 | f1 = 208.59 | f/f1 = 0.65 | | |
|---|---|---|---|---|
| fz = 31.59 | fz/f = 0.23 | ω = 45.87 | d0 = 37.0 | |
| lens surface No. | | Ry | d | n |
| 1 | | 2822.00 | 15.6 | 1.48617 |
| 2 | | −105.00 | 2.0 | |
| 3 | | −270.00 | 13.3 | 1.48617 |
| 4 | | −107.00 | 91.6 | |
| 5 | | −1000.00 | 5.0 | 1.48617 |
| 6 | | −762.00 | 35.00 | |

TABLE 5

1st lens surface; aspheric coefficient $K = 4.12$
$A4 = -1.34 \times 10^{-7}$
$A6 = 2.77 \times 10^{-11}$
$A8 = -3.16 \times 10^{-15}$

TABLE 6

5th lens surface; radius of curvature in sub scanning direction $Rzo = 15.64$
$1/Rz = 1/Rzo + B2Y^2 + B4Y^4 + B6Y^6$
$B2 = -2.20 \times 10^{-6}$
$B4 = 9.58 \times 10^{-11}$
$B6 = -1.90 \times 10^{-15}$

Embodiment 3

Figure 7:
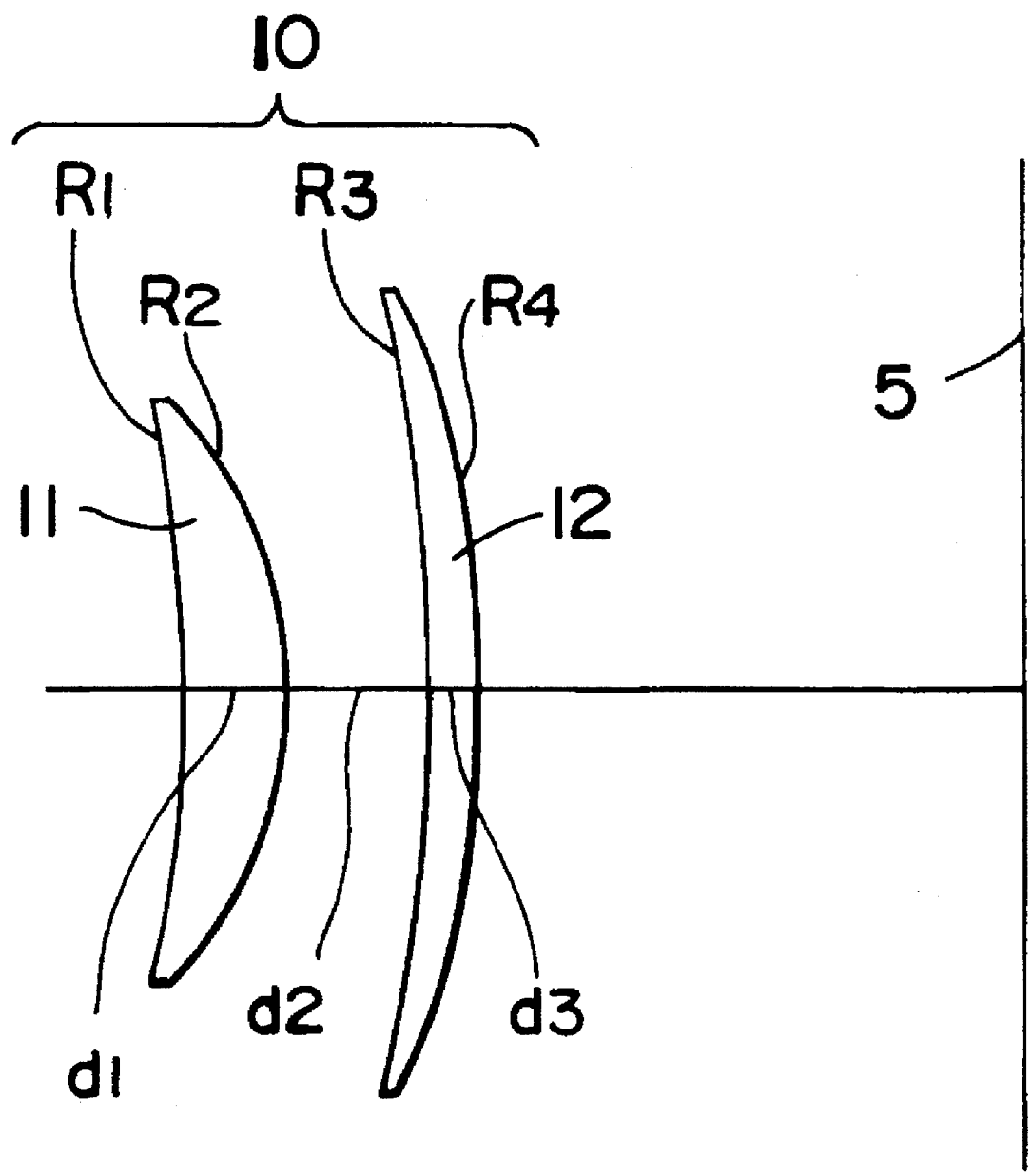
FIG. 7 is a conceptual view of an fθ lens system according to a third embodiment of the present invention.
Figure 8:
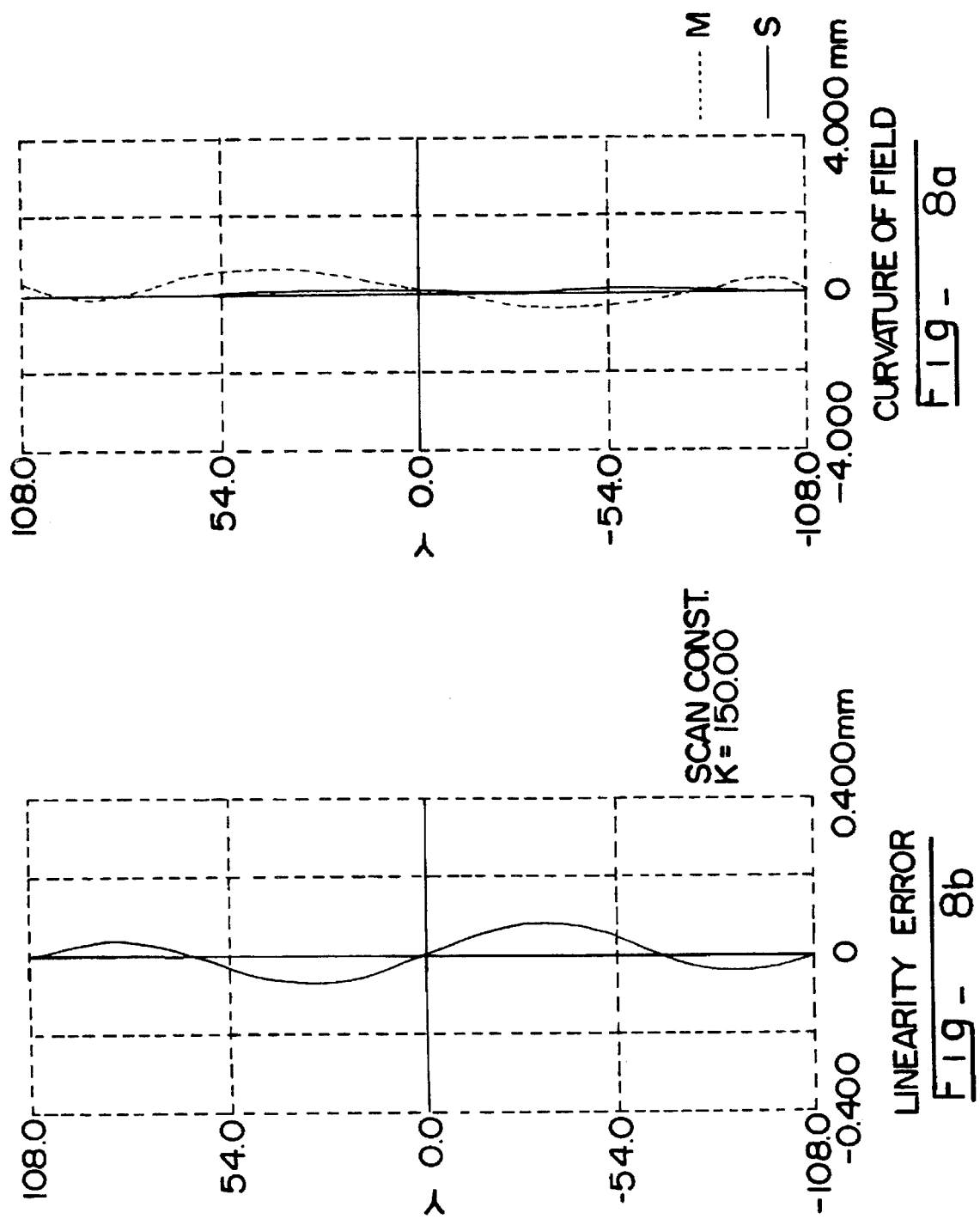
FIGS. 8a and 8b are diagrams of fθ characteristics and the curvature of the field, of the fθ lens shown in FIG. 7.

FIG. 7 shows a third example of the lens structure. In the third embodiment and the subsequent embodiments discussed below, the fθ lens system 10 includes an imaging lens 11 and a correcting lens 12 only. The imaging lens 11 contains most of the power of the fθ lens 10. Numerical data of the third embodiment is shown in Table 7 below. FIGS. 8a and 8b show the fθ characteristics (errors) and the curvature of the field (out of focus), of the fθ lens in the third embodiment, respectively. The term "d4" designates the distance from the terminal lens surface to the image surface 5. In the third embodiment, the first, second and third lens surfaces are aspheric surfaces, and the aspheric coefficients thereof are shown in Table 8 below. The third lens surface is a deformed toric surface whose shape is represented by data shown in Table 9 below.

TABLE 7

| f = 149.50 | f1 = 151.68 | f/f 1= 0.99 | | |
|---|---|---|---|---|
| fz = 50.05 | fz/f = 0.33 | ω = 41.39 | d0 = 31.8 | |
| lens surface No. | | Ry | d | n |
| 1 | | −228.00 | 13.5 | 1.48617 |
| 2 | | −56.80 | 21.0 | |
| 3 | | −218.00 | 7.0 | 1.48617 |
| 4 | | −202.70 | 128.3 | |

TABLE 8

1st lens surface; aspheric coefficient $K = 2.01$
$A4 = -7.32 \times 10^{-7}$
$A6 = 5.56 \times 10^{-11}$ 2nd lens surface aspheric coefficient $K = 0.192$
$A4 = 4.49 \times 10^{-7}$ TABLE 8-continued $A6 = 8.64 \times 10^{-11}$
4th lens surface; aspheric coefficient $K = 4.28$
$A4 = -3.91 \times 10^{-7}$
$A6 = 4.59 \times 10^{-13}$

TABLE 9

3rd lens surface; radius of curvature in sub scanning direction $Rzo = 27.34$
$1/Rz = 1/Rzo + B1Y + B2Y^2 + B3Y^3 + B4Y^4 + B5Y^5 + B6Y^6$
$B1 = -7.62 \times 10^{-6}$
$B2 = -4.89 \times 10^{-6}$
$B3 = -4.56 \times 10^{-9}$
$B4 = 5.32 \times 10^{-10}$
$B5 = 1.11 \times 10^{-12}$
$B6 = -2.47 \times 10^{-14}$ Embodiment 4

Figure 9:
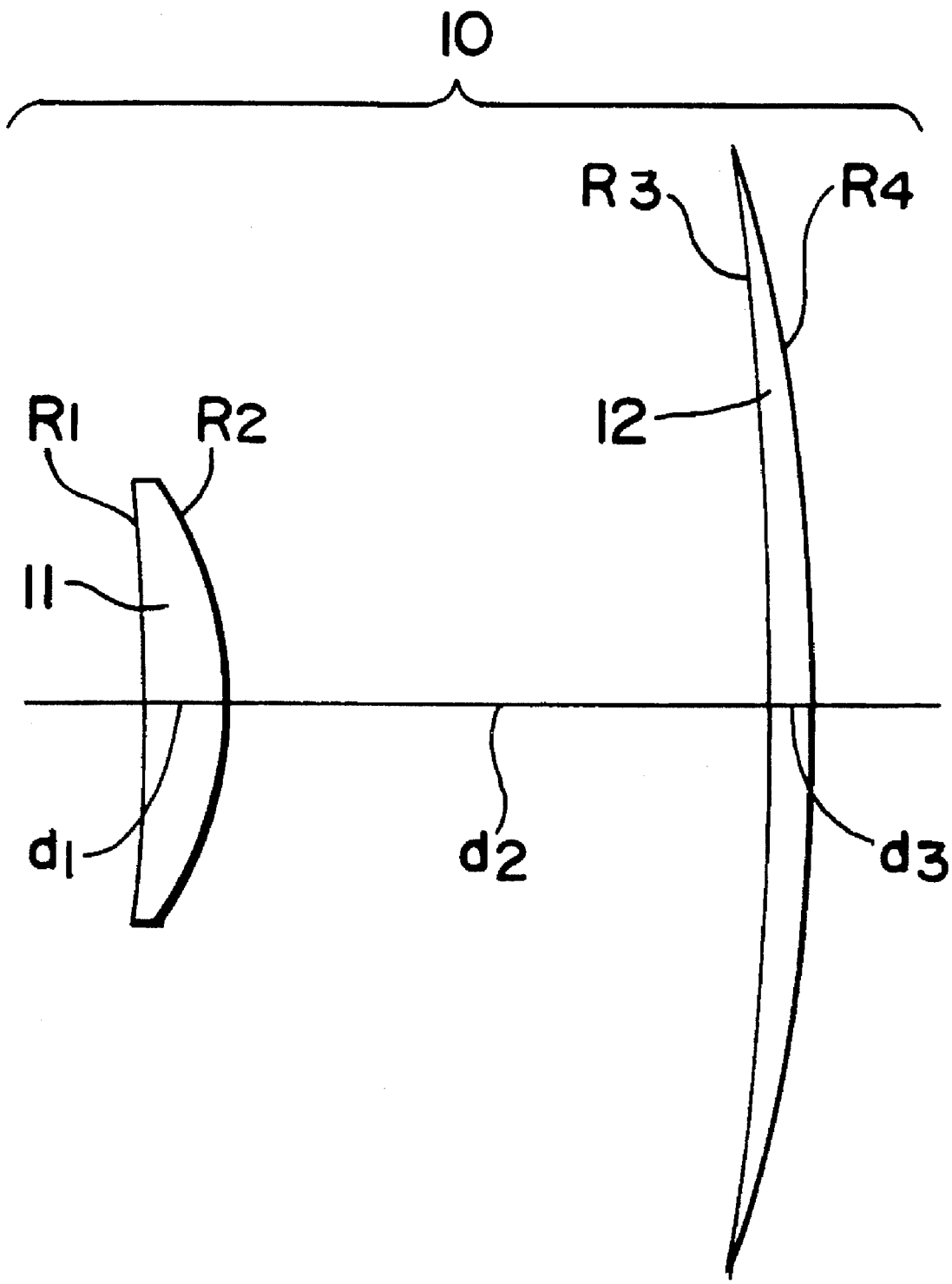
FIG. 9 is a conceptual view of an fθ lens system according to a fourth embodiment of the present invention.
Figure 10:
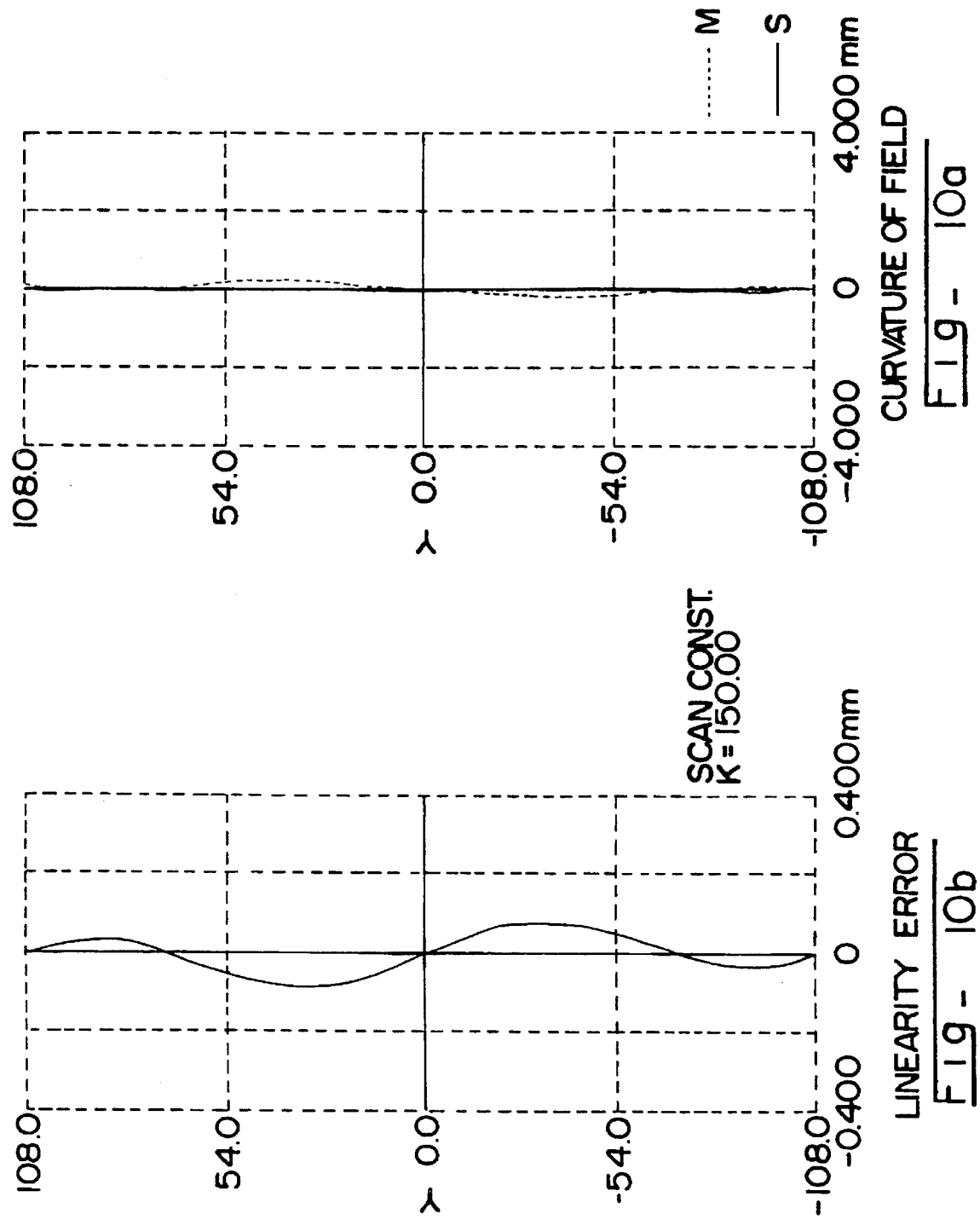
FIGS. 10a and 10b are diagrams of fθ characteristics and the curvature of the field, of the fθ lens shown in FIG. 9.

FIG. 9 shows a fourth example of the lens structure. Numerical data of the fourth embodiment is shown in Table 10 below. FIGS. 10a and 10b show the fθ characteristics (errors) and the curvature of the field (out of focus), of the fθ lens in the fourth embodiment, respectively. In the fourth embodiment, the first, second and fourth lens surfaces are aspheric surfaces, and the aspheric coefficients thereof are shown in Table 11 below. The third lens surface is a deformed toric surface whose shape is represented by data shown in Table 12 below.

TABLE 10

| f = 149.44 | f1 = 149.23 | f/f1 = 1.00 | |
|---|---|---|---|
| fz = 43.72 | fz/f = 0.29 | ω = 41.39 | d0 = 31.8 |
| lens surface No. | Ry | d | n |
| 1 | -264.286 | 13.5 | 1.51920 |
| 2 | -60.962 | 90.0 | |
| 3 | -600.000 | 7.5 | 1.48617 |
| 4 | -569.411 | 57.1 | |

TABLE 11

1st lens surface; aspheric coefficient $K = -0.1314$
$A4 = -2.2898 \times 10^{-8}$
$A6 = 2.9964 \times 10^{-12}$
2nd lens surface; aspheric coefficient $K = -0.1050$
$A4 = 1.1902 \times 10^{-7}$
$A6 = -5.7086 \times 10^{-12}$
4th lens surface; aspheric coefficient $K = 4.7560$
$A4 = -1.0336 \times 10^{-7}$
$A6 = 1.2215 \times 10^{-12}$

TABLE 12

3rd lens surface; radius of curvature in sub scanning direction $Rzo = 21.986$
$1/Rz = 1/Rzo + B1Y + B2Y^2 + B3Y^3 + B4Y^4 + B5Y^5 + B6Y^6$
$B1 = 3.93947 \times 10^{-7}$
$B2 = -2.21370 \times 10^{-6}$
$B3 = -9.56109 \times 10^{-10}$
$B4 = 1.23493 \times 10^{-10}$
$B5 = 7.16315 \times 10^{-14}$
$B6 = -5.63417 \times 10^{-15}$ Embodiment 5

Figure 11:
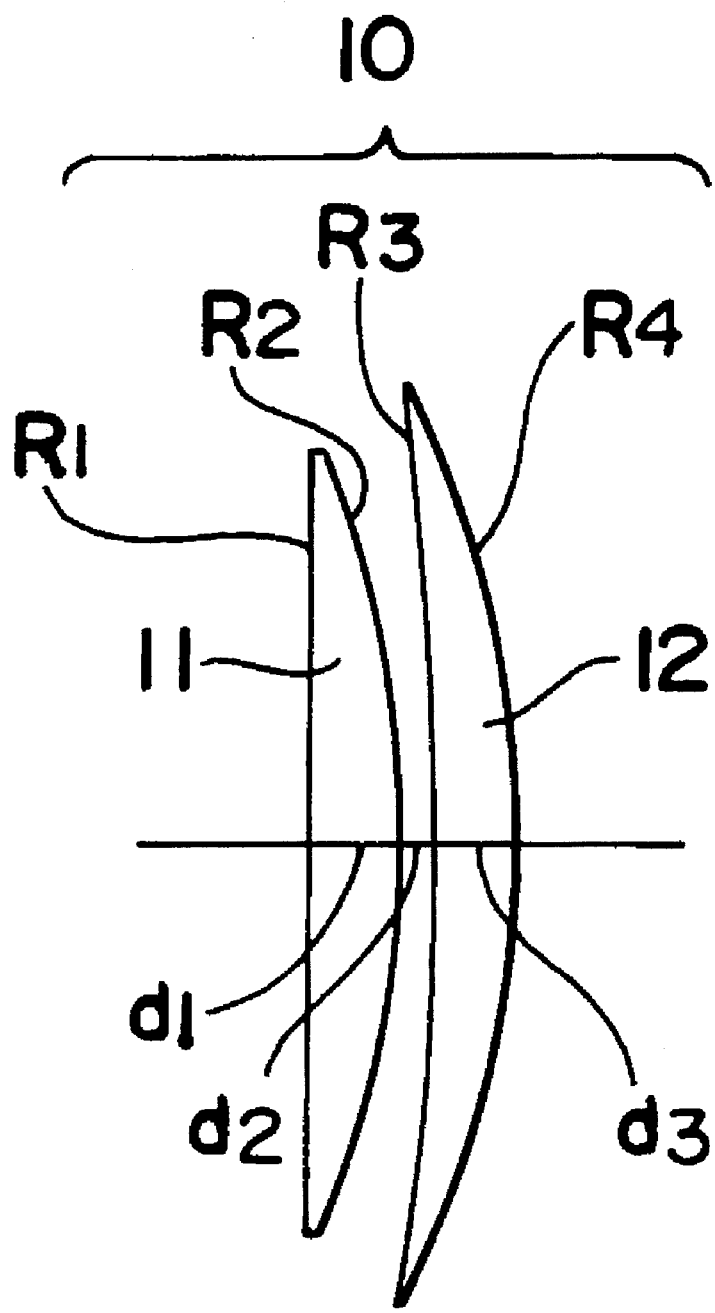
FIG. 11 is a conceptual view of an fθ lens system according to a fifth embodiment of the present invention.
Figure 12:
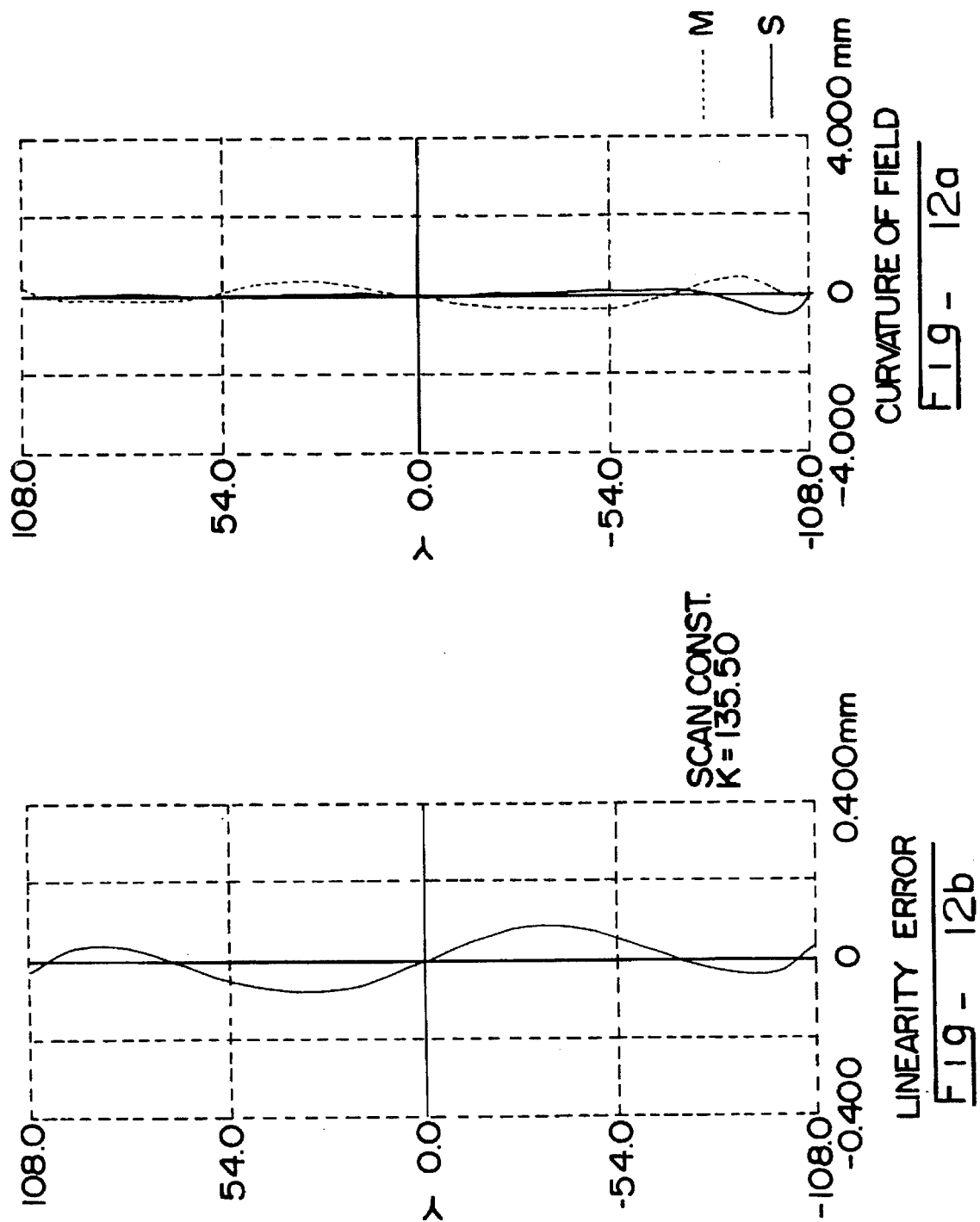
FIGS. 12a and 12b are diagrams of fθ characteristics and the curvature of the field, of the fθ lens shown in FIG. 11.

FIG. 11 shows a fifth example of the lens structure. Numerical data of the fifth embodiment is shown in Table 13 below. FIGS. 12a and 12b show the fθ characteristics (errors) and the curvature of field (out of focus), of the fθ lens in the fifth embodiment, respectively.

In the fifth embodiment, the first, second and fourth lens surfaces are aspheric surfaces, and the aspheric coefficients thereof are shown in Table 14 below. The third lens surface is a deformed toric surface whose shape is represented by data shown in Table 15 below.

In the fifth embodiments in which the fθ lens system 10 consists of the imaging lenses 11 and 12 only, the two imaging lenses 11 and 12 preferably satisfy the following relationship, similar to the above mentioned embodiments in which the fθ lens system 10 includes the imaging lenses 11 and 12 and the correcting lens 13;

$$.6 \leq f/f1 \leq .7$$

wherein "f1" designates the focal length of the imaging lens that is located closer to the deflector in the main scanning direction; and "f" the focal length of the whole scanning lens system in the main scanning direction, respectively.

TABLE 13

| f = 134.98 | fz = 39.95 | fz/f = 0.30 | |
|---|---|---|---|
| ω = 45.87 | d0 = 34.0 | f/f1 = 0.70 | |
| lens surface No. | Ry | d | n |
| 1 | 1986.00 | 10.9 | 1.48617 |
| 2 | -98.10 | 3.0 | |
| 3 | -331.00 | 9.9 | 1.48617 |
| 4 | -127.20 | 129.26 | |

TABLE 14

1st lens surface; aspheric coefficient $K = 2.27$
$A4 = -2.34 \times 10^{-7}$
$A6 = -2.86 \times 10^{-12}$
2nd lens surface; aspheric coefficient $K = 0.448$
$A4 = 7.31 \times 10^{-7}$
$A6 = -2.32 \times 10^{-10}$
14th lens surface; aspheric coefficient $K = 0.578$
$A4 = -4.57 \times 10^{-7}$
$A6 = 8.76 \times 10^{-11}$

TABLE 15

3rd lens surface; radius of curvature in sub scanning direction $Rzo = 22.34$
$1/Rz = 1/Rzo + B1Y + B2Y^2 + B3Y^3 + B4Y^4 + B5Y^5 + B6Y^6$
$B1 = -3.180 \times 10^{-5}$
$B2 = -1.258 \times 10^{-5}$
$B3 = -1.780 \times 10^{-9}$
$B4 = 3.510 \times 10^{-9}$
$B5 = 2.260 \times 10^{-12}$
$B6 = -4.960 \times 10^{-13}$ As may be seen from Tables above, the value of f/f1 in embodiments 1, 2, and 5 satisfies $0.6 \leq f/f1 \leq 0.7$ As can be understood from the above discussion, according to the present invention, since the correcting lens having the deformed toric surface whose radius of curvature in the sub scanning direction is determined independently of the radius of curvature in the main scanning direction is provided in the scanning lens system, the curvature of field in the main scanning direction and the sub scanning direction can be independently corrected, thus resulting in a high resolution (i.e., definition) printing.

Furthermore, since the correcting lens is located adjacent to the image surface at a position in which the magnification is small, if the correcting lens of complex shape is made of plastic, little or no focus fluctuation occurs due to the change in temperature.

In addition to the foregoing, if the correcting lens is constituted by a meniscus lens with a convex surface that faces the image surface, light is substantially perpendicularly incident upon the correcting lens. Consequently, if S-polarized light is made incident, there is little or no loss of optical energy due to the reflection which takes place upon incidence.

I claim:

1. An optical scanning system comprising:
    a light source;
    a scanning deflector which deflects a bundle of rays emitted from said light source; and,
    a scanning lens system which converges the deflected bundles of rays onto an image surface to form an image,
    wherein said scanning lens system comprises at least two lenses, one of said lenses that is closest to said image surface being a meniscus convex lens that is disposed in a main scanning direction of said image surface, said meniscus convex lens having a surface which is convex in the main scanning direction facing said image surface,
    and wherein the surface of said meniscus convex lens nearest to said scanning deflector is a deformed toric surface, said deformed toric surface being convex in a sub-scanning direction facing said scanning deflector, the sub-scanning direction being normal to the main scanning direction,
    and further wherein said convex toric surface has a radius of curvature which is determined independently of a radius of curvature in the main scanning direction.

2. The optical scanning system of claim 1, wherein said scanning lens system comprises an imaging lens group which mainly functions to form an image, and a correcting lens group which mainly functions to correct an aberration on said image surface, and wherein said imaging lens group is located nearer to said scanning deflector than said correcting lens group, and further wherein said deformed toric surface is provided on said correcting lens group.

3. The optical scanning system of claim 2, wherein said imaging lens group comprises two imaging lenses.

4. The optical scanning system of claim 3, wherein said correcting lens group comprises a single lens.

5. The optical scanning system of claim 3, wherein said two imaging lenses of said imaging lens group have a positive power in the main scanning direction.

6. The optical scanning system of claim 5, wherein said two imaging lenses of said imaging lens group satisfy a following relationship;

$$.6 \leq f/f1 \leq .7$$

wherein "f1" designates a focal length of said lens of said imaging lens group that is located nearest to said scanning deflector in the main scanning direction, and "f" designates a focal length of said scanning lens system as a whole in the main scanning direction.

7. The optical scanning system of claim 1, wherein said scanning lens system consists of two imaging lenses.

8. The optical scanning system of claim 7, wherein said two imaging lenses satisfy a following relationship;

$$.6 \leq f/f1 \leq .7$$

wherein "f1" designates a focal length of said imaging lens that is located nearest to said scanning deflector in the main scanning direction, and "f" designates a focal length of said scanning lens system as a whole in the main scanning direction.

9. The optical scanning system of claim 1, wherein said meniscus lens having said deformed toric surface is made by plastic molding.

10. The optical scanning system of claim 1, further comprising:
    an anamorphic lens between said light source and said scanning deflector for converging said bundle of rays in the sub scanning direction, wherein said bundle of rays is made incident upon a deflecting surface of said scanning deflector.

11. An optical scanning system comprising a light source, a scanning deflector which deflects a bundle of rays emitted from said light source, and a scanning lens system which converges the deflected bundle of rays onto an image surface to form an image, said scanning lens system being comprised of at least two lenses which satisfy a following relationship;

$$.6 \leq f/f1 \leq .7$$

wherein "f1" designates a focal length of a lens of a scanning lens group that is located nearest to said scanning deflector in a main scanning direction, and wherein "f" designates a focal length of said scanning lens system as a whole in the main scanning direction.

12. The optical scanning system of claim 11, wherein a lens of a scanning lens group closest to said image surface is made of a meniscus lens with a convex surface that faces said image surface in the main scanning direction, wherein a surface of a meniscus lens nearest to said scanning deflector is a deformed toric surface which is convex in a sub scanning direction facing said scanning deflector, the sub scanning direction being normal to the main scanning direction, and further wherein said convexed toric surface has a radius of curvature which is determined independently of a radius of curvature in the main scanning direction.

13. An optical scanning system comprising:

a light source;

a scanning deflector which deflects a bundle of rays emitted from said light source; and, a scanning lens system which converges said deflected bundle of rays onto an image surface to form an image, wherein said scanning lens system comprises at least two lenses, one of said lenses that is closest to said image surface being a meniscus convex lens that is disposed in a main scanning direction of said image surface, said meniscus convex lens having a surface which is convex in said main scanning direction facing said image surface, wherein a surface of said meniscus convex lens nearest to said scanning deflector is a deformed toric surface which is convex in a sub-scanning direction facing said scanning deflector, said sub-scanning direction being normal to said main scanning direction, and wherein a radius of curvature, in said sub-scanning direction, of said deformed toric surface increases from said optical axis towards a periphery of said meniscus convex lens, and centers of curvature in said sub-scanning direction are located along a curved line depending on an image height.

* * * * *

UNITED STATES PATENT AND TRADEMARK OFFICE
CERTIFICATE OF CORRECTION

PATENT NO. : 5,453,870
DATED : September 26, 1995
INVENTOR(S) : Mitsunori IIMA

It is certified that error appears in the above-indentified patent and that said Letters Patent is hereby corrected as shown below:

On the title page, item: [56], "Reference Cited", "U.S. PATENT DOCUMENTS", line 1, change "Matsudka" to ---Matsuoka---.

Signed and Sealed this

Sixteenth Day of July, 1996

Attest:

BRUCE LEHMAN

Attesting Officer

Commissioner of Patents and Trademarks